United States Patent
Liu et al.

(10) Patent No.: US 8,224,037 B2
(45) Date of Patent: Jul. 17, 2012

(54) METHODS INVOLVING FACE MODEL FITTING

(75) Inventors: Xiaoming Liu, Schenectady, NY (US); Peter Henry Tu, Niskayuna, NY (US); Frederick Wilson Wheeler, Niskayuna, NY (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1133 days.

(21) Appl. No.: 12/100,620

(22) Filed: Apr. 10, 2008

(65) Prior Publication Data
US 2009/0257625 A1  Oct. 15, 2009

(51) Int. Cl.
*G06K 9/00* (2006.01)
(52) U.S. Cl. ........ 382/118; 382/100; 382/285; 382/294; 382/295
(58) Field of Classification Search .......... 382/100, 382/118, 285, 294, 295
See application file for complete search history.

(56) References Cited

U.S. PATENT DOCUMENTS

| | | | |
|---|---|---|---|
| 7,006,683 B2* | 2/2006 | Brand | 382/154 |
| 7,142,697 B2* | 11/2006 | Huang et al. | 382/118 |
| 7,885,455 B2* | 2/2011 | Liu et al. | 382/160 |
| 2003/0072482 A1* | 4/2003 | Brand | 382/154 |
| 2007/0292049 A1* | 12/2007 | Liu et al. | 382/299 |

OTHER PUBLICATIONS

Koterba et al. "Multi-View AAM Fitting and Camera Calibration" in Proc. 10th Int. Conf. on Computer Vision, Bejing, China, vol. 1, pp. 511-518, Oct. 2005 ("Koterba").*

Xiaoming Liu, Frederick Wheeler and Peter Tu, Improved Face Model fitting on Video Sequences, British Machine Vision Confernce Procedings , Sep. 2007.

* cited by examiner

*Primary Examiner* — Stephen R Koziol
(74) *Attorney, Agent, or Firm* — MH2 Technology Law Group LLP

(57) ABSTRACT

A method for face model fitting comprising, receiving a first observed image, receiving a second observed image, and fitting an active appearance model of a third image to the second observed image and the first observed image with an algorithm that includes a first function of a mean-square-error between a warped image of the second observed image and a synthesis of the active appearance model and a second function of a mean-square-error between the warped image of the second observed image and an appearance data of the first observed image.

14 Claims, 2 Drawing Sheets

METHODS INVOLVING FACE MODEL FITTING

BACKGROUND OF THE INVENTION

The described embodiments relate generally to face model fitting, and more particularly face model fitting images from video sources.

Model-based image registration and alignment is used to recognize facial images in computer systems. A facial image may, for example, be compared to a database to identify an image. The facial image is often manipulated (aligned) to allow comparison to the database.

One method for registering and aligning a facial image uses active appearance models (AAM). Face alignment using AAM enables facial feature detection, pose rectification, and gaze estimation. Some facial images are received from a video source that includes multiple images. It is desirable for an AAM method to incorporate images from a video source.

Conventional methods for fitting an AAM to video sequences directly fit the AAM to each frame by using the fitting results, i.e., a shape parameter and an appearance parameter of a previous frame as the initialization of a current frame. Fitting faces of an unseen subject may be difficult due to a mismatch between the appearances of the facial images used for training the AAM and that of the video sequences. This difficulty is especially evident when a facial subject is exposed to varying illumination. The conventional method also registers each frame with respect to the AAM, without registering frame-to-frame across a video sequence.

The shape model and appearance model part of an AAM are trained with a representative set of facial images. The shape model and appearance model are trained from a database of facial images. The distribution of facial landmarks are modeled as a Gaussian distribution that is regarded as the shape model. The procedure for training a shape model is as follows. Given a face database, each facial image is manually labeled with a set of 2D landmarks, [xi, yi] i=1, 2, ..., v. The collection of landmarks of one image is treated as one observation from the random process defined by the shape model, s=[x1,y1,x2,y2, ..., xv,yv]T. Eigen-analysis is applied to the observation set and the resulting linear shape model represents a shape as, $$s(P) = s_0 + \sum_{i=0}^{n} p_i s_i \quad (1)$$

where $s_0$ is the mean shape, $s_i$ is the $i^{th}$ shape basis, and $p=[p_1, p_2, ..., p_n]$ are the shape parameters. By design, the first four shape basis vectors represent global rotation and translation. Together with other basis vectors, a mapping function from the model coordinate system to the coordinates in the image observation is defined as W(x;p), where x is a pixel coordinate defined by the mean shape so.

After the shape model is trained, each facial image is warped into the mean shape using a piecewise affine transformation. These shape-normalized appearances from all training images are fed into an eigen-analysis and the resulting model represents an appearance as, $$A(x; \lambda) = T(x) + \sum_{i=0}^{m} \lambda_i A_i(x) \quad (2)$$

where T is the mean appearance, $A_i$ is the $i^{th}$ appearance basis, and $\lambda=[\lambda_1, \lambda_2, ..., \lambda_m]$ are the appearance parameters. FIG. 1 illustrates an example of an AAM trained using a subject from a 3D face database. A linear shape model 102 is shown above an appearance model 104.

An AAM can synthesize facial images with arbitrary shape and appearance within the range expressed by the training population. Thus, the AAM can be used to analyze a facial image by finding the optimal shape and appearance parameters such that the synthesized image is as similar to the image observation as possible. This leads to the cost function used for model fitting, $$J(p, \lambda) = \sum_{x \in s_0} [I(W(x; p)) - A(x; \lambda)]^2 \quad (3)$$

which is the mean-square-error (MSE) between the image warped from the observation I(W(x;p)) and the synthesized appearance model instance A(x;λ). Traditionally this minimization problem is solved by iterative gradient-descent methods that estimate Δp, Δλ, and add them to p,λ.

The Simultaneously Inverse Compositional (SIC) method is an image alignment algorithm that minimizes a distance of the warped image observation and the generic AAM model during the fitting. The SIC method however, is applied to video images by fitting each frame of a video independently from the other frames in the video. A method that registers images frame-to-frame across a video sequence is desired.

BRIEF DESCRIPTION OF THE INVENTION

An exemplary method for face model fitting comprising, receiving a first observed image, receiving a second observed image, and fitting an active appearance model of a third image to the second observed image and the first observed image with an algorithm that includes a first function of a mean-square-error between a warped image of the second observed image and a synthesis of the active appearance model and a second function of a mean-square-error between the warped image of the second observed image and an appearance data of the first observed image.

An alternate exemplary method for face model fitting comprising, receiving a first observed image, receiving a second observed image, receiving a third observed image, and fitting an active appearance model of a fourth image to the third observed image, the second observed image, and the first observed image with an algorithm that includes a first function of a mean-square-error between a warped image of the third observed image and a synthesis of the active appearance model and a second function of a mean-square-error between a warped image of the third observed image and an appearance data of the first and second observed images.

Another alternate embodiment of a method for face model fitting comprising, receiving a first observed image, receiving a second observed image, and fitting an active appearance model of a third image to the second observed image and the first observed image with an algorithm $$J_t(p) = \sum_{x \in s_0} \left[ \sum_{i=1}^{m}(x) - I_t(W(x; p)) \right]^2 + k \sum_{x \in s_0} [M_t(x) - I_t(W(x; p))]^2,$$

where T is a mean appearance, $A_i$ is an $i^{th}$ appearance basis, $\lambda = [\lambda_1, \lambda_2, \ldots, \lambda_m]$ are appearance parameters, $I_t(W(x;p))$ is an image warped from the second observed image, k is a constant value, $S_0$ is a mean shape, x is a pixel coordinate defined by the mean shape, $p=[p_1, p_2, \ldots, p_n]$ are shape parameters, and the $M_t(x)$ function includes appearance information from the first observed image.

These and other features, aspects, and advantages will become better understood when the following detailed description is read with reference to the accompanying drawings in which like characters represent like parts throughout the drawings, wherein:

DETAILED DESCRIPTION OF THE INVENTION

Figure 1:
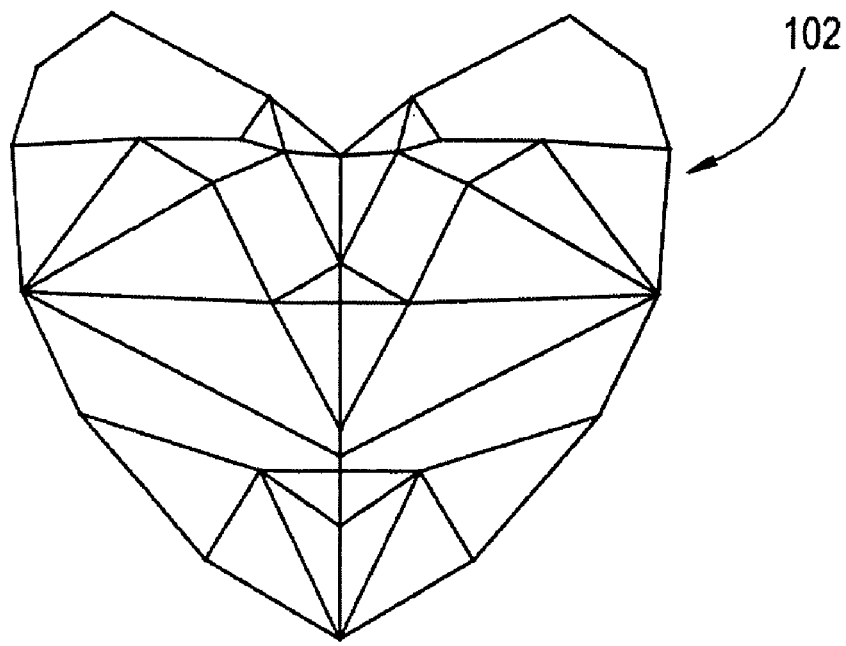
FIGS. 1 and 2 illustrate examples of facial models.

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding the embodiments. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

The example of the SIC method described above fits the face model with a single observed image. Previous methods involving video as the observed image fit the face model with each frame of a video. For example, a video having 100 frames would use each frame as an independent observed image, and apply the SIC method to fit the face model of each frame. Since video provides a series of frames each slightly different from the last frame, an improved SIC method that incorporates similar frames in a video provides a more robust and efficient fitting method.

Simultaneously Inverse Compositional for Video (SICOV) is an exemplary method for applying SIC to video. Given a generic AAM and a video frame $I_t$ at time t, SICOV uses the following cost function to perform the face model fitting:

$$J_t(p, \lambda) = \qquad (4)$$

$$\sum_{x \in s_0} \left[ T(x) + \sum_{i=1}^{m} \lambda_i A_i(x) - I_t(W(x; p)) \right]^2 + k \sum_{x \in s_0} [M_t(x) - I_t(W(x; p))]^2$$

which is composed of two terms weighted by a constant k. The first term is similar to Equation (3), i.e., the MSE between the warped image and the synthesized appearance model instance. The second term is the MSE between the current warped image $I_t(W(x;p))$ and the appearance information of the current subject from previous frames in the video, $M_t(x)$.

For example, the example of SIC described above in Equation (3) fits a face model to a single observed image. In the exemplary SICOV function of Equation (4), the face model is fit to a first observed image of a video frame at a time t. The $M_t(x)$ function includes appearance information from previous observed images of video frames (i.e., frames taken prior to the video frame at the time t.)

The function $M_t(x)$ may be defined in a number of different terms. For example, $M_t(x)$ may be defined as the warped image of the video frame at a time t−1:

$$M_t(x) = I_{t-1}(W(x; p_{t-1})) \qquad (5)$$

The function $M_t(x)$ may also be defined, for example, as the warped images of L number of previous video frames weighted by a decaying factor:

$$M_t(x) = \frac{1-r}{r(1-r^L)} \sum_{l=1}^{L} r^l I_{t-1}(W(x; p_{t-1})) \qquad (6)$$

where r is a decaying factor between 0 and 1. In practice, when fitting the video frame at time t, both definitions of $M_t(x)$ may be computed efficiently from the previous fitting results.

Figure 2:
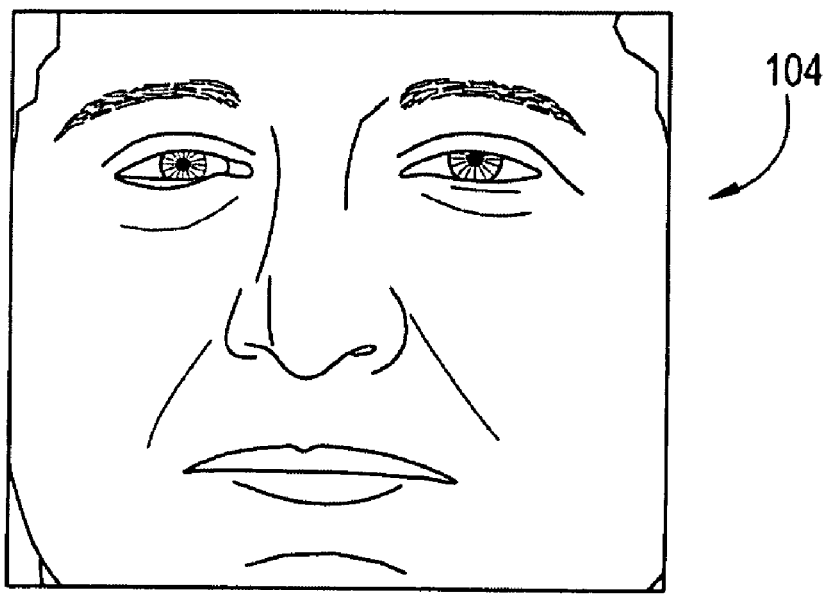
Figure 3:
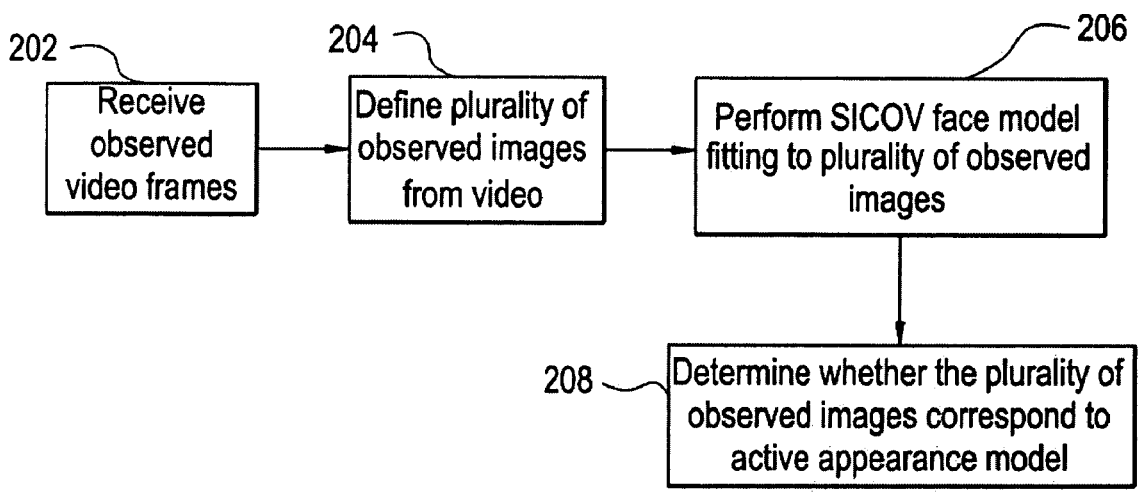
FIG. 3 illustrates a block diagram of an exemplary method of face model fitting.

FIG. 2 illustrates an exemplary block diagram of the method described above. In block 202, observed video frames are received. The observed video frames include a plurality of observed images that are defined in block 204. In block 206, the SICOV face model fitting of equation (4) above is performed with the plurality of received observed images and an image from a database. The SICOV face model fitting includes the $M_t(x)$ function that may include, for example, on of the embodiments described above including, but not limited to equations (5) and (6). Alternate embodiments of the method may include other definitions of the $M_t(x)$ function described below.

Equations (5) and (6) are nonlimiting examples of definitions of $M_t(x)$. Other definitions of $M_t(x)$ are also possible, for example, an average of L previous warped images without decaying, and a dynamic eigenspace model of the sequentially add the most recent warped image into the model. Additional appearance parameters of the eigenspace model may be incorporated into the second term of Equation (4).

The terms in Eq. (4) may be described as the distance between the current image observation and the generic face model and the subject-specific model respectively that is obtained in an on-line fashion from image observation at previous time instances. Thus in the fitting of each frame, both distance measures are served as constraints to guide the fitting process.

The SICV algorithm is derived below. The SICOV algorithm iteratively minimizes:

$$\sum_{x} \left[ T(W(x; \Delta p)) + \sum_{i=1}^{m} (\lambda_i + \Delta \lambda_i) A_i(W(x; \Delta p)) - I_t(W(x; \Delta p)) \right]^2 + \qquad (7)$$

-continued $$k \sum_x [M_t(W(x; \Delta p)) - I_t(W(x; \Delta p))]^2$$

with respect to $\Delta p$ and $\Delta \lambda = (\Delta \lambda_1, \ldots, \Delta \lambda_m)^T$ simultaneously, and the updates the warp $W(x;p) \rho W(x;p)) W(x;\Delta p)^{-1}$ and the appearance parameter $\lambda = \lambda + \Delta \lambda$.

In order to solve $\Delta p$ and $\Delta \lambda$, the non-linear expression in Equation (7) is linearized by performing a first order Taylor series expansion on $T(W(x;\Delta p))$, $A_i(W(x;\Delta p))$, and $M_t(W(x; \Delta p))$, and assuming that $W(x;0)$ is the identity warp. This gives:

$$\sum_x \left[ T(x) + \nabla T \frac{\partial W}{\partial p} \Delta p + \sum_{i=1}^m (\lambda_i + \Delta \lambda_i) \left( A_i(x) + \nabla A_i \frac{\partial W}{\partial p} \Delta p \right) - I_t(W(x; \Delta p)) \right]^2 + k \sum_x \left[ M_t(x) + \nabla M_t \frac{\partial W}{\partial p} \Delta p - I_t(W(x; p)) \right]^2 \quad (8)$$

The first terminal in the above equation may be simplified to the following by neglecting the second order terms:

$$\sum_x \left[ T(x) + \sum_{i=1}^m \lambda_i A_i(x) - I_t(W(x; p)) + \left( \nabla T + \sum_{i=1}^m \lambda_i \nabla A_i \right) \frac{\partial W}{\partial p} \Delta p + \sum_{i=1}^m A_i(x) \Delta \lambda_i \right]^2 \quad (9)$$

To simplify the notation, firstly we denote $q = (p^T \lambda^T)^T$ and similarly $\Delta q = (\Delta p^T \Delta^T)^T$. Thus q is an n+m dimensional vector including both the shape parameters p and the appearance parameters $\lambda$. Secondly, we denote n+m dimensional steepest-decent images:

$$SD(x) = \left( \left( \nabla T + \sum_{i=1}^m \lambda_i \nabla A_i + k \nabla M_t \right) \frac{\partial W}{\partial p_1}, \ldots , \right. \quad (10)$$

$$\left. \left( \nabla T + \sum_{i=1}^m \lambda_i \nabla A_i + k \nabla M_t \right) \frac{\partial W}{\partial p}, A_1(x), \ldots , A_m(x) \right)$$

Thirdly, we denote the error image:

$$E(x) = T(x) + \sum_{i=1}^m \lambda_i A_i(x) - I_t(W(x; p)) + k(M_t(x) - I_t(W(x; p))) \quad (11)$$

Equation (8) is simplified to:

$$\sum_x [E(x) + SD(x)\Delta q]^2 \quad (12)$$

The partial derivative to Equation (12) with respect to $\Delta q$ is:

$$2 \sum_x SD^T(x)[E(x) + SD(x)\Delta q] \quad (13)$$

The closed form solution of Equation (7) is obtained by setting Equation (13) equal to zero:

$$\Delta q = -H^{-1} \sum_x SD^T(x) E(x) \quad (14)$$

where $H^{-1}$ is the inverse of the Hessian matrix:

$$H = \sum_x SD^T(x) SD(x) \quad (15)$$

There are clear benefits from using two models during the face model fitting. In practical applications there is often a mismatch between the imaging environment of the images used for training face models and the images to be fit, as well as the presence of the specific appearance information of the subject being fit that is not modeled by the generic face models. Thus, the distance-to-subject-specific-model is employed to bridge such a gap. If only the subject-specific model used, the alignment error would propagate over time. The generic model is well suited for preventing the error propagation and correcting drifting.

This written description uses examples to disclose the embodiments, including the best mode, and also to enable practice of the embodiments, including making and using any devices or systems and performing any incorporated methods. The patentable scope of the embodiments is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed:

1. A method for face model fitting comprising:
   receiving a first observed image;
   receiving a second observed image; and
   fitting an active appearance model of a third image to the second observed image and the first observed image with an algorithm that includes a first function of a mean-square-error between a warped image of the second observed image and a synthesis of the active appearance model and a second, function of a mean-square-error between the warped image of the second observed image and an appearance data of the first observed image.

2. The method of claim 1, further comprising determining whether the warped image of the second observed image and the appearance data of the first observed image correspond to the third image.

3. The method of claim 1, wherein the appearance data of the first observed image is a warped image of the first observed image.

4. The method of claim 1, wherein the first observed image and the second observed image are video frames.

5. A method for face model fitting comprising:
receiving a first observed image;
receiving a second observed image;
receiving a third observed image; and
fitting an active appearance model of a fourth image to the third observed image, the second observed image, and the first observed image with an algorithm that includes a first function of a mean-square-error between a warped image of the third observed image and a synthesis of the active appearance model and a second function of a mean-square-error between a warped image of the third observed image and appearance data of the first and second observed images;
wherein the appearance data of the first and second observed images is an average of a warped image of the first observed image and a warped image of the second observed image.

6. The method of claim 5, further comprising determining whether the warped image of the third observed image and the appearance data of the first and second observed images correspond to the appearance model of the fourth image.

7. The method of claim 5, wherein the average of the warped image is a decaying average.

8. A method for face model fitting comprising:
receiving a first observed image;
receiving a second observed image;
receiving a third observed image; and
fitting an active appearance model of a fourth image to the third observed image, the second observed image, and the first observed image with an algorithm that includes a first function of a mean-square-error between a warped image of the third observed image and a synthesis of the active appearance model and a second function of a mean-square-error between a warped image of the third observed image and appearance data of the first and second observed images;
wherein the appearance data of the first and second observed images is a dynamic eigenspace model of a warped image of the first observed image and a warped image of the second observed image.

9. The method of claim 5, wherein the first observed image, the second observed image, and the third observed image are video frames.

10. A method for face model fitting comprising:
receiving a first observed image;
receiving a second observed image; and
fitting an active appearance model of a third image to the second observed image and the first observed image with an algorithm $$J_t(p, \lambda) = \sum_{x \in s_0} \left[ T(x) + \sum_{i=1}^{m} \lambda_i A_i(x) - I_t(W(x; p)) \right]^2 + \sum_{x \in s_0} [M_t(x) - I_t(W(x; p))]^2,$$

where T is a mean appearance, $A_i$ is an $i^{th}$ appearance basis, $\lambda=[\lambda_1, \lambda_2, \ldots, \lambda_m]$ are appearance parameters, $I(W(x,p))$ is an image warped from the second observed image, k is a constant value, $S_0$ is a mean shape, x is a pixel coordinate defined by the mean shape, $p=[p1, p2, \ldots, pn]$ are shape parameters, and the $M_t(x)$ function includes appearance information from the first observed image.

11. The method of claim 10, wherein the $M_t(x)$ function is defined as $M_t(x)=I_{t-1}(W(x; P_{t-1}))$, where t is a time associated with the second observed image and t−1 is a time associated with the first observed image.

12. The method of claim 10, wherein the method further comprises receiving a plurality of observed images from video frames,
defining a group of L number of images, wherein the group includes the plurality of observed images and the first observed image; and
defining the $M_t(x)$ function as $$M_t(x) = \frac{1-r}{r(1-r^L)} \sum_{l=1}^{L} r^l I_{t-1}(W(x; p_{t-1})),$$

wherein
r is a decaying factor between 0 and 1, and t is a time associated with the second observed image and t−1 is a time associated with the first observed image.

13. The method of claim 10, wherein the method further comprises
receiving a plurality of observed images from video frames,
defining a group of L number of images, wherein the group includes the plurality of observed images and the first observed image; and
defining the $M_t(x)$ function as an average of warped images of the group of L number of images.

14. The method of claim 10,
receiving a plurality of observed images from video frames,
defining a group of L number of images, wherein the group includes the plurality of observed images and the first observed image; and
defining the $M_t(x)$ function as a dynamic eigenspace model of warped images of the group of L number of images.

* * * * *